March 13, 1956 W. A. MILLER 2,738,469

MICROWAVE FILTER

Filed Aug. 11, 1950 4 Sheets-Sheet 1

INVENTOR
WILLIAM A. MILLER
BY J. L. Whittaker
ATTORNEY

March 13, 1956 W. A. MILLER 2,738,469

MICROWAVE FILTER

Filed Aug. 11, 1950 4 Sheets-Sheet 2

INVENTOR
WILLIAM A. MILLER
BY J. L. Whittaker
ATTORNEY

March 13, 1956 W. A. MILLER 2,738,469

MICROWAVE FILTER

Filed Aug. 11, 1950 4 Sheets-Sheet 3

INVENTOR
WILLIAM A. MILLER
BY J. L. Whittaker
ATTORNEY

INVENTOR
WILLIAM A. MILLER
BY
J. L. Whittaker
ATTORNEY

United States Patent Office 2,738,469

Patented Mar. 13, 1956

1

2,738,469

MICROWAVE FILTER

William A. Miller, Miller Place, N. Y., assignor to Radio Corporation of America, a corporation of Delaware Application August 11, 1950, Serial No. 178,804

The terminal 15 years of the term of the patent to be granted has been disclaimed 1 Claim. (Cl. 333—73)

This invention relates to microwave guide filters and particularly to such filters in which interference is caused between components of the waves of the frequencies to be rejected.

More particularly, the invention provides for the splitting of the transmitted waves in the waveguide of a microwave system into two components at right angles to each other, transmitting the two components of the waves down a waveguide of a critical length and having different indexes of refraction for the two components (birefringent) and recombining the two components at the end of the predetermined length of the birefringent waveguide section, where the components of the waves of other than the pass-band frequency are eliminated by interference therebetween, and from which end of the birefringent guide section the waves of the pass-band frequency or the filtered waves are further transmitted.

The invention further provides for the combination of birefringent sections of waveguides in series with each other or with filter sections of other types, such as an interferometer filter, and in combination with phase shifters and waveguide sections of other dimensions and characteristics and of predetermined lengths.

The obtaining of more highly selective filters has become more important with the increase in demands for the use of microwave apparatus. In some localities, the microwave transmissions have become so crowded that a more economical use of the available frequencies must be made. The frequencies must not only be accurate, but they must be controlled within definite and narrow limits of bandwidths. In some cases, such as for example in the multi-transmitter use of a single antenna, highly discriminating filters are essential.

The principal object of the invention is to provide a microwave filter in which constructive interference is caused in the pass-band frequency waves and destructive interference is caused between components of waves of other than the pass-band frequencies.

Another object of the invention is to provide a microwave filter of high discrimination that is independent of load conditions of the waveguide system.

Another object of the invention is to provide a microwave filter of high discrimination without introducing into the waveguide any extraneous materials, either insulating or conducting.

Another object of the invention is to provide a microwave filter of high discrimination in which are sections of waveguides that effect different velocities of propagation along their lengths of components of the same wave.

Another object of the invention is to provide a microwave filter of high discrimination that includes a waveguide section having different indexes of refraction in its two longitudinal or axial planes of transmission.

Another object of the invention is to provide a microwave filter of high discrimination that includes a tunable interferometer filter section.

Other objects and advantages of the invention will be

2 apparent from the following detailed description made with reference to the accompanying drawings in which:

*Birefringent guide filter*

Figure 1:
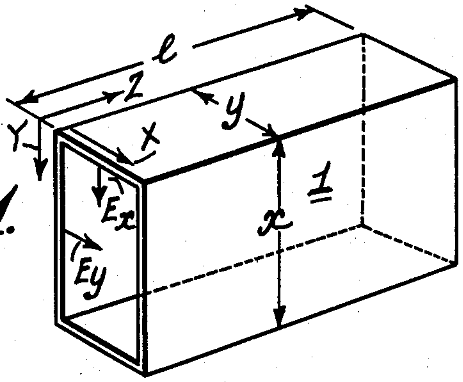
Fig. 1 is a view in perspective of a rectangular waveguide.

Referring to Fig. 1, 1 is a rectangular waveguide of width $y$ in the direction of arrow X, of height $x$ in the direction of arrow Y and of length $l$ in the direction of arrow Z. The guide 1 is of such physical dimensions that it will support simultaneously the transmission of a $TE_{01}$ mode of radiation along its length ($\pm Z$) with its electric vector ($Ex$) perpendicular to the X direction of the guide and a $TE_{01}$ mode of radiation along its length ($\pm Z$) with its electric vector ($Ey$) perpendicular to the Y direction of the guide. The guide 1 thus has two mutually perpendicular dimensions in which the group velocities of the propagated radiation may be adjusted by controlling the $x$ and/or the $y$ dimensions of the guide. These X and Y directions are defined as the propagation axes or, more simply, the "axes" of the guide. The guide, therefore, has two indexes of refraction for waves propagated along the length of the guide, that is, the guide is birefringent. The index of refraction along the axes is real for a $TE_{01}$ mode if $l$ equals or is greater than $\lambda a/2$ and imaginary if $l$ equals or is less than $\lambda a/2$, where $\lambda a$ is the wavelength of the radiation in air.

By definition:

$$n=\frac{Va}{Vg} \qquad (1)$$

where $n$ is the index of refraction, $Va$ is the velocity of propagation in air and $Vg$ is the group velocity in the guide.

For a $TE_{01}$ mode in rectangular guides, $$n=\frac{Va}{Va\left[1-\left(\frac{\lambda a}{\lambda c}\right)^2\right]^{1/2}} \qquad (2)$$

$$n=\frac{1}{\left[1-\left(\frac{\lambda a}{\lambda c}\right)^2\right]^{1/2}} \quad (3)$$

where $\lambda c$ is the critical wavelength of the guide.

Figure 2:
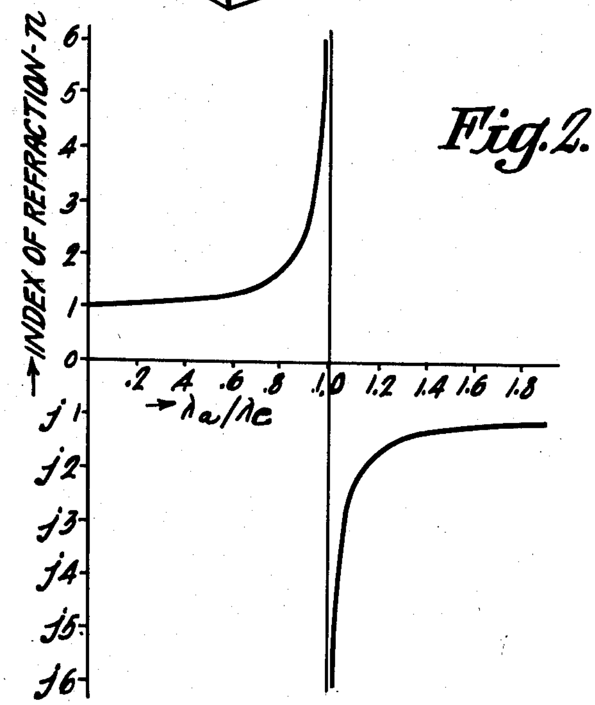
Fig. 2 is a graph showing the relation of a so-called index of refraction in a waveguide to the ratio of (1) the wavelength of the radiation in air to (2) the critical wavelength of the guide.

In Fig. 2, there is plotted the values of $n$ over a range of values of $\lambda a/\lambda c$ from zero to 1.7. The graph is a plot of Equation 3 from which it will be noted that for values of $\lambda a/\lambda c$ greater than unity, the values of $n$ are imaginary, as indicated in the lower half of Fig. 2 by ($j$).

If $x$ is greater than $y$ (Fig. 1), then $n_x$ is less than $n_y$, where $n_x$ is the index of refraction for propagation in $TE_{01}$ mode in the birefringent guide with the E vector perpendicular to the XZ plane of the guide and $n_y$ is the corresponding index of refraction for the propagation in the guide with the E vector perpendicular to the YZ plane of the guide.

Figure 3:
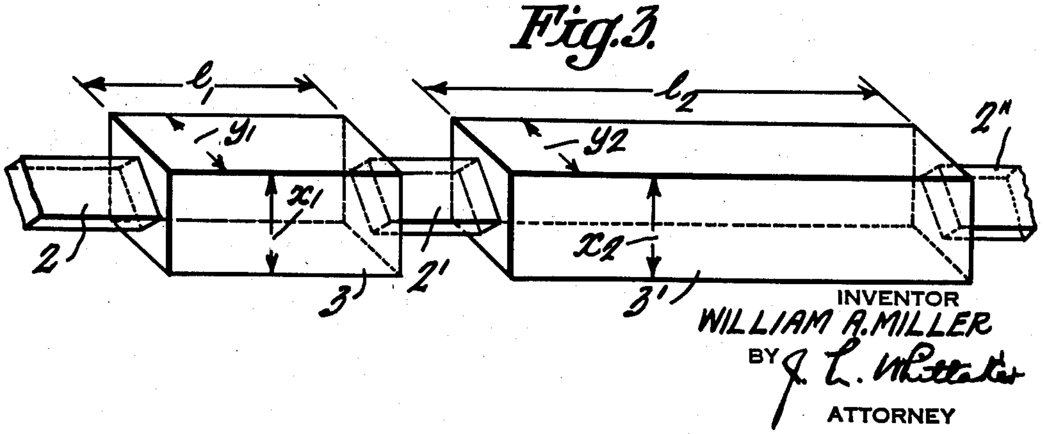
Fig. 3 is a view in perspective of a filter comprising two birefringent filter sections in cascade.

Referring to Fig. 3, 2 is a non-birefringent rectangular waveguide connected to birefringent waveguide section 3 of dimensions $x_1$ and $y_1$, respectively. The non-birefringent guide, hereinafter referred to as a polarizer, is set at an angle of 45 degrees to both the $x$ and $y$ axes of guide section 3. When a wave in guide 2 of $TE_{01}$ mode is fed into guide section 3, the wave will split into two components at right angles to each other and each component will be propagated along guide section 3 independently of the other. The index of refraction for the components will be $n_x$ and $n_y$, respectively.

For the purpose of analysis, let it be assumed that $x_1$ is greater than $y_1$, then $n_x$ is less than $n_y$.

If the length of guide section 3 in cm. is $l_1$, then for the $n_x$ wave:

$$l_1=n_x l_1 \text{ cm. of air}$$

and for the $n_y$ wave, $$l_1=n_y l_1 \text{ cm. of air}$$

The path difference between the wave components is:

$$(n_y-n_x)l_1 \text{ cm. of air}$$

and the retardation ($p$) becomes:

$$p=\frac{\text{path difference}}{\lambda a}\ \frac{l_1\mu}{\lambda_a} \quad (4)$$

where $\mu$ is the difference between the indexes of refraction of guide section 3 in the $x$ and $y$ axes, respectively.

At the output end of guide section 3, there is connected a second polarizer 2', set at an angle of 45 degrees to the $x$ and $y$ axes of guide section 3 and parallel to polarizer 2. Interference will take place at this connecting point between the $n_x$ and $n_y$ components of the input waves.

The transmitted intensity (T) in polarizer 2' will be:

$$T=\cos^2\pi p$$

where T is the relative power transmitted through polarizer 2', assuming unit amplitude or voltage or current input from polarizer 2.

It will thus be seen that the guide section 3 and the two polarizers 2 and 2' constitute a filter section and when such a section is transmitting waves of various wavelengths, the power at the output end of the filter section will be zero for all wavelengths such that for a given length, $l$, of the birefringent guide section, the retardation $p$ is $m'/2$, where $m'$ is an odd integer and the power at the output end of the filter section will be a maximum where $m$ is an integer.

Referring again to Fig. 3, the output end of polarizer 2' is connected to birefringent guide section 3', the axes of polarizer 2' being set at 45 degrees to both the $x$ and $y$ axes of guide section $3'$. Likewise, a third polarizer 2'' is connected to the output end of guide section 3'. Two filter sections are thus connected in cascade.

If the detardations of the two filter sections are $p_1$, and $p_2$, the relative power transmitted $T_2$ becomes:

$$T_2=\cos^2\pi p_1\cdot\cos^2\pi p_2 \quad (5)$$

and with $m$ sections, $$T_m=\prod^m \cos^2 \pi pm \quad (6)$$

where $$\prod^m$$

means a progressively continuing or a continuous product over all integral values of $m$ from unity to $m$.

If it is desired to combine the filter sections to apply to a particular pass-band frequency, the length of the birefringent guide sections, or the indexes of refraction, or both, must be so adjusted that the retardations of the various units are integrally related. That is: $p_2=2p_1$; $p_3=2p_2$; $p_4=2p_3$; etc. Therefore, $p_2=2p_1$; $p_3=4p_1$; $p_4=8p_1$; etc.

This relation reduces to the equation:

$$p_m=2^{m-1}p_1 \quad (7)$$

When such a relation exists between filter sections, all maxima passed by the first unit will be passed by the other sections in cascade and all waves of intermediate wavelengths between the maxima passed by the first section will be reduced to practically zero.

It will be noted that, in a filter made up of sections in cascade, the spacing between pass-bands is determined by the filter unit having the minimum retardation and the width of the pass-bands at the half-power point (3 db down) is a function of the filter section having the maximum retardation and a function of the number of sections in cascade.

If $n_x$ and $n_y$ are equal in all of the units, the retardation $p$ may be varied by changing the length $l$ of the birefringent guide sections in the circuits. Also, for this condition the individual lengths of the birefringent guide sections in filter sectons in cascade is:

$$l_m=2^{m-1}l_1 \quad (8)$$

where $l_m$ is the length of the birefringent guide section in the $m$th filter section of the series, $m$ is an integer, and $l_1$ is the length of the first birefringent guide section.

For the $TE_{01}$ mode:

$$\mu=n_y-n_x$$
$$=\lambda_{cy}(\lambda^2_{cy}-\lambda^2 a)^{1/2}-\lambda_{cx}(\lambda^2_{cx}-\lambda^2 a)^{1/2} \quad (9)$$

The effect of dispersion (D) within the birefringent guide section of the filter, the variations of the index of refraction with changes in $\lambda a$, may be determined by differentiating $\mu$ with respect to $\lambda a$. D then becomes:

$$D=\frac{d\mu}{d\lambda a}=\lambda a\ \frac{\lambda_{cy}}{(\lambda^2_{cy}-\lambda^2 a)^{3/2}}-\frac{\lambda_{cx}}{(\lambda^2_{cx}-\lambda^2 a)^{3/2}} \quad (10)$$

The effect of dispersion in the filter of this invention is to reduce all maxima of frequencies higher than the pass-band frequency and to crowd together all maxima of lower frequency. These latter maxima may be eliminated by making the polarizers 2, 2', etc., of such a width as will cut off these undesirable maxima.

Referring to Fig. 3, the dimensions of such a filter to pass 1 cm. radiation are as follows: $x_1=x_2=x_3=x_4=$ 0.833 cm.; $y_1=y_2=y_3=y_4=0.562$ cm., cut-off wavelength ($\lambda_c$) of polarizers 2, 2', 2'', 2''', = 1.05 cm.; $l_1=1$ cm.; $l_2=2$ cm.: $l_3=4$ cm.; $l_4=8$ cm.; length of polarizer between birefringent guide sections=1.0 cm.; $n_x=1.25$; $n_y=2.25$; $\mu=1$.

Figure 4:
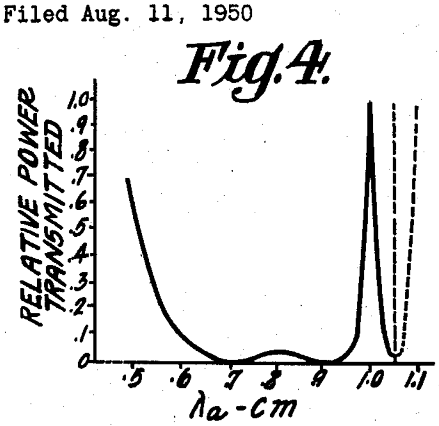
Fig. 4 is a graph showing the relation of relative power transmitted by a filter to the wavelength of the transmitted waves in air ($\lambda a$)
Figure 6:
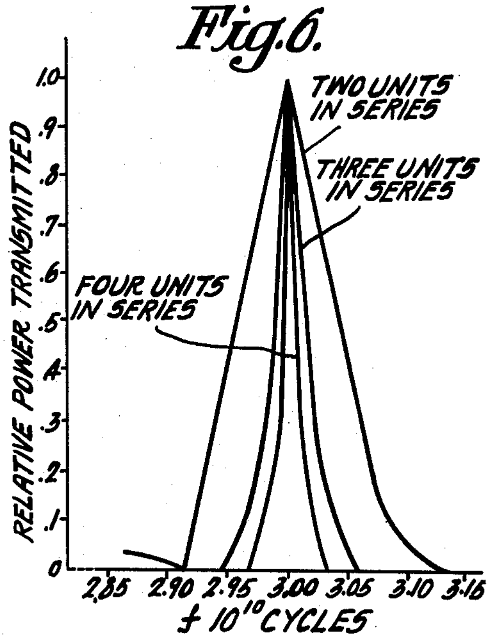
Fig. 6 is a group of graphs showing the narrowing of the pass-band of the filter by adding filter sections in cascade.
Figure 5:
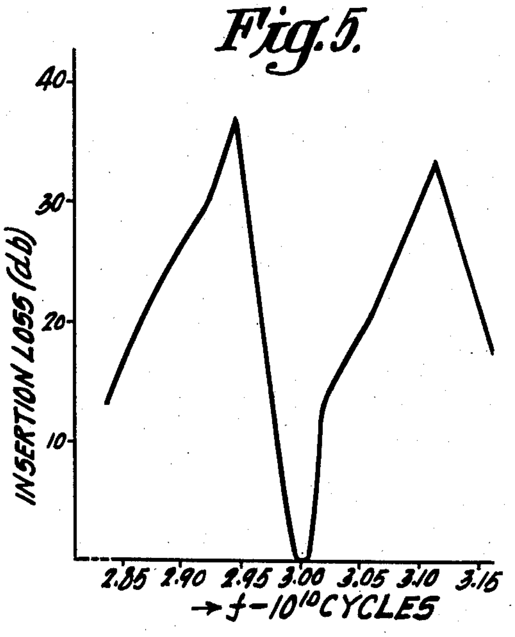
Fig. 5 is a graph showing the relation of insertion losses expressed in decibels to the wavelength of the transmitted waves in air ($\lambda a$)

Figs. 4, 5, and 6 are graphs showing the operational characteristics of the filter defined hereinabove.

In plotting the graph in Fig. 4, relative power transmitted versus $\lambda a$ in cm., dispersion was taken into account by calculating the value of retardation for each wavelength from the curve in Fig. 2. The effect of making the critical wavelength of polarizers 2, 2', etc., equal to 1.05 cm., is shown at the right end of the graph where waves having lengths above 1.05 cm. are cut off.

In Fig. 5 is plotted a graph showing the relation of (1) the insertion losses of a three-section filter in db to (2) the input frequencies.

Fig. 6 is a group of graphs showing the effect of using two, three and four filter sections in cascade on the width of the pass-band.

It will be noted that the percent bandwidth at the half-power point is constant with the filter. The dimensions of the filter are, therefore, proportional to the wavelength. Once the dimensions have been determined for one wavelength, other wavelengths can be provided for by reducing or increasing all the dimensions of the original filter by a conversion factor.

It will also be noted that the dispersion within the filter increases with the differences between the indexes of refraction ($\mu$) of the two axes of the birefringent guide section. It is apparent that the dispersion can be decreased by changing the values of the index of refraction and these changes may be compensated for by changing the length of the birefringent guide section.

From the graphs of Fig. 6, which were prepared from the operation of the filter of Fig. 2 built to pass waves of 30,000 mc., the width of the pass-band at 3 db down is 1000 mc. With three sections in cascade the bandwidth is 200 mc. and with four sections in series the bandwidth is 30 mc.

*Polarizing interferometer guide filter*

In the use of the filter in Fig. 3, in some waveguide systems, it may not be practical because of space conditions to incorporate into the filter a sufficient number of units thereof to obtain the desired minimum width of the pass-band. Thus, in the example of a filter in Fig. 3, the dimensions were so chosen that the physical lengths of the filter units were multiples (1, 2, 4 and 8) of the free-space wavelength at the transmission maximum. This resulted in a fairly dispersive system which could lessen its application or value in a tunable filter. However, it is obvious that if such a filter is changed to have a lower dispersion, the lengths of the units and the number of units may be increased such that space for longer dimensions of the filter may not be available.

To overcome the practical installation problems that may arise in extreme cases, such as in a microwave frequency control system, a polarizing interferometer filter section, as will hereinafter be described, may be used in combination with the birefringent filter sections. For example, four birefringent guide units may be used in cascade with one or more interferometer guide filter sections.

Figure 7:
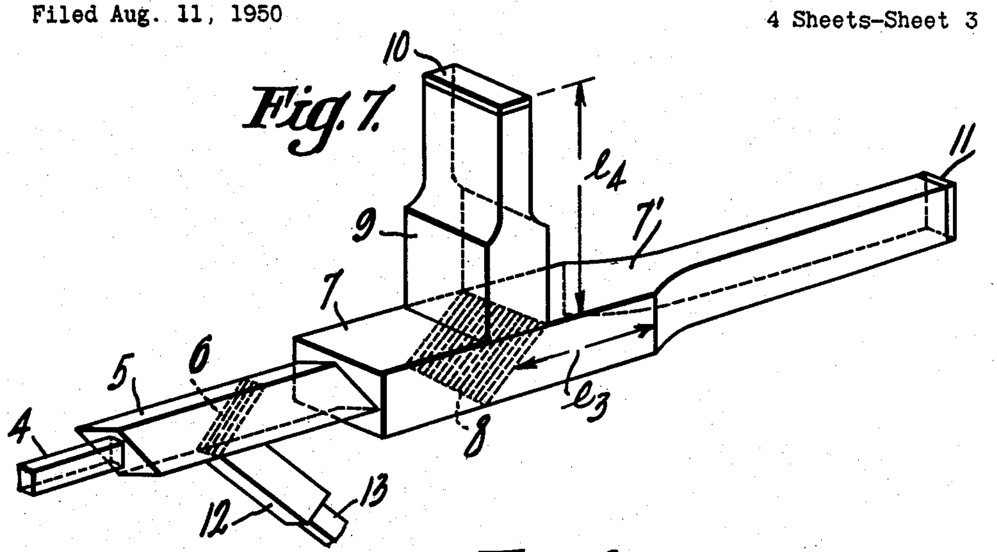
Fig. 7 is a view in perspective of a polarizing interferometer filter.

Referring to Fig. 7, 4 is a rectangular waveguide transmitting waves, in a $TE_{01}$ mode, one frequency of which it is desired to be passed through the filter. Guide 4 is connected to square guide section 5 with the sides of guide 4 at an angle of 45° to the sides of guide 5. A wave, launched by the rectangular guide 4, is divided into two components polarized at right angles to each other by passage through the grating 6. The said two components, still in the same phase relation, enter a second square guide section 7 and pass therethrough until they reach a second wire grating 8. Grating 8 is mounted at an angle of 45 degrees to the longitudinal axes of guide 7.

Grating 8 reflects upward into guide section 9 the waves of the component the electric vector of which is parallel to the wires of the grating 8. Guide 9 is short-circuited by an end plate 10 which reflects the waves in guide 9 back to screen 8 whence they are reflected back toward screen 6.

In the meantime, waves of the other component, the component the electric vector of which is perpendicular to the wires in grating 8, pass through the grating 8 and continue along guide 7', which is a continuation of guide 7, until they reach end plate 11 thereof, where they are reflected back towards grating 8 and towards grating 6.

Interference occurs at the grating 6 between the components of the waves reflected by plates 10 and 11. The path difference ($p$) between these waves is twice the difference between the lengths of guide 7' ($l_3$) and guide 9 ($l_4$). If guide 7' has an index of refraction of $n_3$ and guide 9 has an index of refraction of $n_4$, $$p=\frac{2(n_3l_3-n_4l_4)}{\lambda} \tag{11}$$

and the power transmitted (T) is:

$$T=\cos^2\frac{2\pi}{\lambda}(n_3l_2-n_4l_4) \tag{12}$$

It is apparent that the retardation, $p$, may be readily adjusted by adjusting the relative lengths of $l_3$ and $l_4$. This may be done by inserting conventional movable tuning plugs in the ends of the guides 7' and 9, respectively.

The waves that do not suffer destructive interference are reflected by grating 6 into guide 12 and hence into output guide 13.

Guides 7 and 9 are shown as square with transition sections connecting them into rectangular guides. Both guides 7 and 9 may be either square or rectangular, but if rectangular, the two guides are positioned at 90 degrees with respect to each other.

*Phase shifting between filter sections*

It will be noted in Equation 6 that the power transmitted varies as the square of the cosine of the phase shift $\pi p_m$. It follows that if a phase shifter is inserted in filter units and the phase shift is thereby increased or decreased by $2\pi g$, Equation 6 becomes:

$$T_m=\prod^{m}\cos^2\pi(p_m+g) \tag{13}$$

where $g$ is an angle of phase shift.

It is, therefore, possible to tune a filter, that is, center the transmission maximum on any desired wavelength, by adjusting $g$ to such a value that $(p+g)$ for each filter section is an integer. From an examination of Equation 13, it will be seen that this factor $(p+g)$ may be made to equal an integer if $g$ can be varied in value from $-\frac{1}{2}$ to $+\frac{1}{2}$.

*Phase shifter for rectangular waveguides*

Heretofore, phase shifters for waveguides have either been of the "pinch" section or sliding or line stretching type, in which one section of a waveguide is lengthened with respect to another waveguide section or of the rotating type in which one section of the waveguide is rotated about its longitudinal axis in relation to another similar section of waveguide. The latter type has been limited in its use to round waveguides and to the modes of propagation that require such round guides.

As the filter of this invention includes birefringent waveguide sections that are rectangular in cross-section, a new construction of rotating phase shifter has been devised. The phase shifter includes in combination two sections of square waveguides rotatable with respect to each other and without loss of transmitted energy, connected to two birefringent guide sections by short transition sections. This combination of guide sections forms a section of a waveguide filter adapted to shift the phases of the polarized components of a wave propagated down a waveguide system.

Two types of the new phase shifters will be described, both of which depend in their operation on the relative rotational positions of the two birefringent guide sections, but neither of which types requires in their operation the relative translation of the two guide sections along the axis of the filter.

In one type of phase shifter, the birefringent guide sections are of such lengths as to cause retardations of one-quarter wavelength between the two separated components of a wave therein. Such birefringent guide sections are designated herein as quarter-wave guides, or more definitely quarter-wave retardation guides. Two quarter-wave retardation guides with two relatively rotatable square guide sections therebetween is designated as a quarter-wave phase shifter.

In the second type of phase shifter, a rotatable birefringent guide section is inserted between two quarter-wave guides by two rotary phase shifters. The inserted birefringent guide section is of such length as to cause retardations between the separated components of a wave therein of one-half wavelength and is designated as a half-wave guide. Likewise, a unity-wave guide section is twice the length of a half-wave guide section and a two-wave guide section is twice the length of a unity-wave guide section. The half-wave guide with the two quarter-wave guides and associated rotary phase shifters is designated as a half-wave phase shifter. One embodiment of each of these types of phase shifters are shown in Figs. 8 and 9 respectively.

Figure 8:
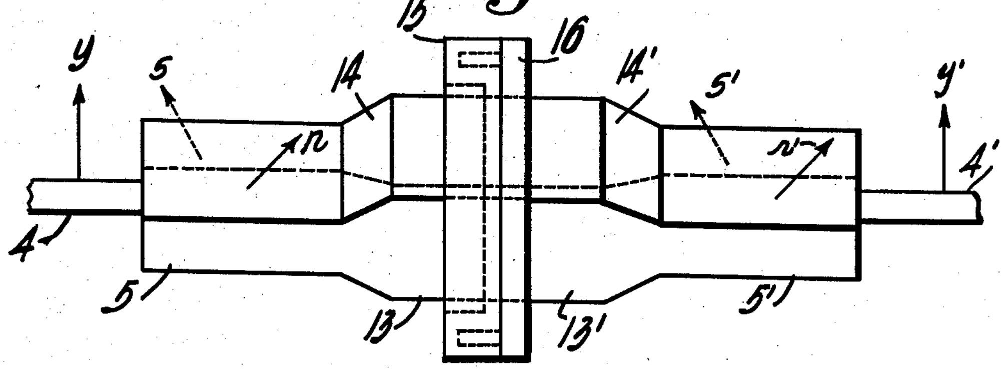
Fig. 8 is a view in perspective of a quarter-wave birefringent waveguide phase shifter, with the sides of the guide sections parallel to each other.
Figure 9:
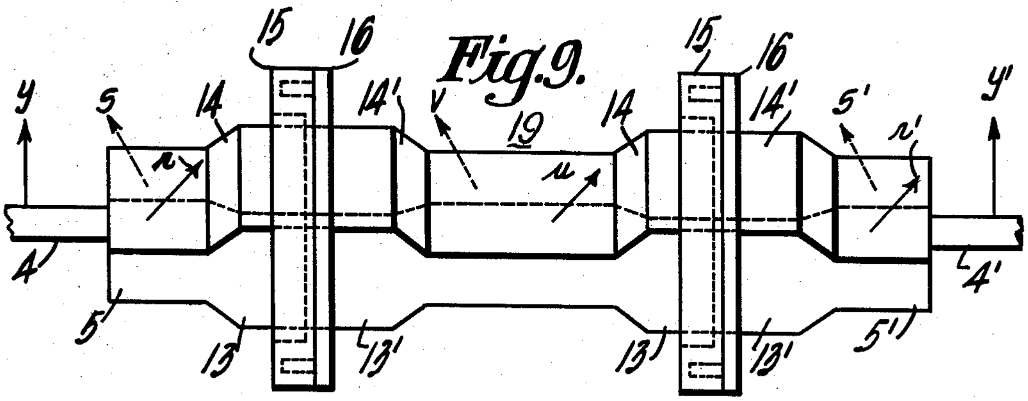
Fig. 9 is a view in perspective of a half-wave birefringent waveguide phase shifter.

Referring to Fig. 8, 4 is a standard waveguide for feeding radiation at an angle of 45 degrees into quarter-wave guide section 5. The direction of the electric vector of the waves transmitted in guide section 4 is indicated by the arrow $y$. Guide section 5 is connected to square guide section 13 by transition guide section 14.

Similarly, for the output end of the phase shifter, the output standard guide section 4′ is connected to quarter-wave guide section 5′. Guide 5′ is connected to square guide section 13′ by transition guide section 14′.

The two square guide sections 13 and 13′ are connected together by a rotatable joint consisting of flanges or rings 15 and 16 which are secured, respectively, to guide sections 13 and 13′. Ring 15 is hollowed out at 17 and near the rim of ring 15 is a hollowed groove 18 that is one quarter of a wavelength deep. This groove 18 acts as a choke to prevent the energy transmitted through the square guide sections from leaking out through the space between rings 15 and 16.

The direction of the electric vectors of the two components within the quarter-waveguide 5 is indicated by the arrows $r$ and $s$ respectively.

In Fig. 8, the sides of the two square guide sections 13 and 13′ are shown as being parallel. There will, therefore, be no shifting of the phase of the two components and the electric vectors of the components in quarter-waveguide section 5′ will be parallel, as shown by arrows $s'$ and $r'$, respectively, to electric vectors $s$ and $r$, respectively. The electric vector $y'$ of the recombined components in the standard guide section 4′ will therefore be parallel to $y$.

A small amount of phase shift may be introduced by the transition guide sections 14 and 14′, but such a shift of phase may be compensated for by adjustment in the length of the quarter-waveguide sections 5 and 5′. That is, in determining the lengths of the quarter-wave sections 5 and 5′, consideration is given to the slight birefringent effect of transition sections 14 and 14′ and the quarter-waveguide sections 5 and 5′ are accordingly adjusted in length to correct for this condition.

From the symmetry of construction, it is apparent that the unit is completely bilateral and the input and output ends may be interchanged without affecting the operation of the device.

In the operation of the device in Fig. 8, guide section 4′ may be rotated about its longitudinal axis with respect to guide section 4. If guide section 5′ is rotated with respect to guide section 5 and guide section 5′ is clamped to guide section 4′, guide section 4′ and all other guide sections to the right of guide section 4′ must also be rotated. In some installations it may be inconvenient to rotate the guide sections to the right of the device. For such installations, there is provided a half-wave phase shifter in which a section of birefringent waveguide is inserted between the two square guide sections and of such length as to cause a relative retardation between the two components in the birefringent waveguide section of one-half wavelength of the transmitted waves. Such a construction is shown in Fig. 9.

In Fig. 9, rings 15 and 16 are connected, respectively, to square guide sections 13 and 13′ and form rotatable joints between the two pairs of square guide sections 13 and 13′. Between this pair of jointed square waveguide sections are the birefringent half-waveguide section 19 and the interconnecting transition sections 14 and 14′. The outer ends of the jointed square wave sections are connected to quarter-waveguide sections 5 and 5′, which are connected, respectively, to the ends of the standard waveguide sections 4 and 4′.

Figure 10:
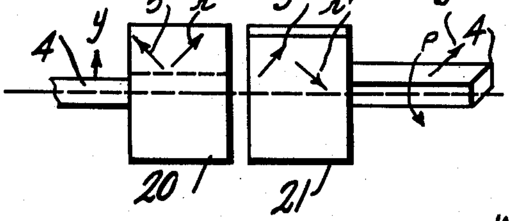
Fig. 10 is a simplified view in perspective of the device of Fig. 8, but with the sides of the birefringent quarter-wave guide sections at an angle to each other.

Fig. 10 is a simplified drawing of the device of Fig. 8 with the two joint-coupled symmetrical sections thereof positioned at an angle $\rho$ to each other. Twenty (20) is a guide section corresponding to quarter-waveguide section 5, transition section 14 and square guide section 13 of Fig. 8. Twenty-one (21) is a guide section corresponding to square guide section 13′, transition section 14′ and quarter-waveguide section 5′ of Fig. 8. Sections 20 and 21 are connected respectively, to standard linear guide sections 4 and 4′. The lengths of sections 20 and 21 are such that the relative retardation $p$ of the two components of the waves transmitted therein is equal to $\pi/2$, that is, they are quarter-waveguides. In Fig. 8, $y$ indicates the direction of the electrical vector in the linear waveguide 4 transmitting a $TE_{01}$ mode wave, and $s$ and $r$ indicate the directions of the electrical vectors, respectively, of the two components of the wave in section 20. $s'$ and $r'$ indicate the directions of the electrical vectors, respectively, of the two components of the wave in section 21 and $y'$ indicates the direction of the electrical vector of the recombined wave components in guide section 4′.

Figure 11:
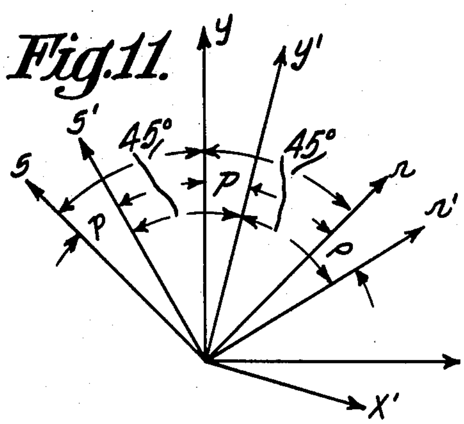
Fig. 11 is a diagram of the electric vectors in the various sections of the device of Fig. 10.

The relative positions of the electrical vectors are shown in Fig. 11 in which corresponding letters and primed letters are applied.

It will be noted in Fig. 11 that $r'$, $s'$, and $y'$ are all displaced, by the angle $\rho$, from $r$, $s$, and $y$, respectively. It will also be noted that $r$ and $s$ are mutually perpendicular to each other and each is at an angle of 45 degrees with respect to $y$. Likewise, $r'$ and $s'$ are perpendicular to each other and each is at an angle of 45 degrees with respect to $y'$.

*Operation of the quarter-wave phase shifter*

As indicated hereinbefore, the property of a quarter-waveguide, which makes it useful for the purpose of phase shifting, is that it will transform linearly polarized radiation to circularly polarized radiation components, provided that the guide is fed by a rectangular waveguide in which the plane of the electrical vector of the linearly polarized radiation is at an angle of 45 degrees to two mutually perpendicular allowable planes of transmission in the quarter-waveguide and provided that the quarter-waveguide is fed with a radiation of such a frequency that the relative retardation between the two components during the travel of the components along the quarter-waveguide is one quarter of the wavelength of the radiated wave. The necessary construction conditions are met by determining the physical lengths of the quarter-waveguide, having consideration for transition sections if any are required for square guide rotatable joint sections, and by determining the indexes of refraction by adjusting the physical dimensions of the sides of the quarter-waveguide section.

Referring again to Figs. 10 and 11, $y$ and $y'$ are the directions of the electrical vectors in the feed guide 4 and 4′, respectively. In the analysis that follows, the subscript ($b$) applied to an electrical vector indicates the position of the vector at the beginning or source side of the guide and the subscript ($e$) indicates the position of the vector at the end or sink side of the guide. By this nomenclature, $r_b$ and $s_b$ are the electrical vectors at the beginning and $r_e$ and $s_e$ are the vectors at the end of the first quarter-waveguide, section 20. $r'_b$ and $s'_b$ are the electrical vectors at the beginning and $r'_e$ and $s'_e$ are the vectors at the end of the second quarter-waveguide, section 21.

It will be noted that $r_b$ and $r_e$ have the same space orientation as $r$, and $s_b$, $s_e$ and $s$ have the same space orientation.

If it be assumed that component $s$ (and $s'$) is the more retarded component in the birefringent guide section, the $r$ vectors may be chosen as references when measuring the relative phases between the vectors. $r_b$ therefore equals $r_e$ and $r'_b$ equals $r'_e$, both for the quarter-waveguide and the half-waveguide. For the quarter-waveguide, $s_e$ is $\pi/2$ behind $s_b$ in phase and $s'_e$ is $\pi/2$ behind $s'_b$ in phase.

For the half-waveguide, $v_e$ is $\pi$ behind $v_b$ in phase and $\mu_b$ equals $\mu_e$, where $\mu$ and $v$ replace $r$ and $s$, respectively, as used in connection with quarter-waveguides.

If $(a)$ is the amplitude of the E vector in the feed guide 4, and it extends in the $y$ direction and if $t$ is time and $f$ is the frequency of the transmitted wave, the radian velocity $(\omega)$ equals $2\pi f$ and $$y=a \sin \omega t \qquad (16)$$

Resolving $y$ along $r$ and $s$ at the beginning of the first quarter-waveguide, $$r_b=\frac{a}{\sqrt{2}} \sin \omega t \qquad (17a)$$

and $$s_b=\frac{a}{\sqrt{2}} \sin \omega t \qquad (17b)$$

At the end of the first quarter-wave section the $s$ vector has been delayed $\pi/2$ radians with respect to the $r$ vector and $$r_e=r_b=\frac{a}{\sqrt{2}} \sin \omega t \qquad (18a)$$

and $$s_e=\frac{a}{\sqrt{2}} \sin \left(\omega t+\frac{\pi}{2}\right)$$

$$=\frac{a}{\sqrt{2}} \cos \omega t \qquad (18b)$$

These two waves, with electrical vectors $r_e$ and $s_e$, then pass into an exactly similar quarter-waveguide which has been rotated about its longitudinal axis by an angle $\rho$ with respect to the first quarter-waveguide. Thus:

$$r_b=r_e \cos \rho-s_e \sin \rho \qquad (19a)$$

and $$s'_b=r_e \sin \rho+s_e \cos \rho \qquad (19b)$$

Substituting the value of $r_e$ and $s_e$ in Equations 18$a$ and 18$b$ in Equations 19$a$ and 19$b$, $$r'_b=\frac{a}{\sqrt{2}} (\sin \omega t \cos \rho-\cos \omega t \sin \rho)$$

$$=\frac{a}{\sqrt{2}} \sin (\omega t-\rho) \qquad (20a)$$

and $$s'_b=\frac{a}{\sqrt{2}} (\sin \omega t \sin \rho+\cos \omega t \cos \rho)$$

$$=\frac{a}{\sqrt{2}} \cos (\omega t-\rho) \qquad (20b)$$

At the end of the second quarter-waveguide $r'_b=r'_e$ and $$r'_e=\frac{a}{\sqrt{2}} \sin (\omega t-\rho) \qquad (21a)$$

and $$s'_e=\frac{a}{\sqrt{2}} \cos (\omega t-\rho+\pi/2)$$

$$=\frac{a}{\sqrt{2}} \sin (\omega t-\rho)$$

Analyzing E along $y'$, which is at an angle of 45 degrees to both $r'$ and $s'$, $$y'=a \sin (\omega t-\rho) \qquad (22)$$

Comparing Equations 16 and 22, it is seen that with the rotation of one section 21 of the device of Fig. 10 with respect to the other section (20) by an angle $\rho$, the amplitude of the E vectors is not changed, but the phase of the E vectors has been shifted through an angle of $\rho$, These two conditions are both necessary and sufficient for the operation of a phase shifting device.

The device is equally effective as a phase shifter when a heterogeneous wave beam is applied, such as might be produced by properly exciting a square waveguide and connecting it to the birefringent quarter-waveguide section 20, Fig. 10.

As an example of the determining of the dimensions of the phase shifter of Fig. 10 for a transmitted wave of 1.0 cm., the indexes of refraction may be assumed as $n_r=1.1$ and $n_s=1.8$. The width of the "$r$ side," the side of the birefringent section to which the $r$ component is perpendicular, and the width of the "$s$ side" may be determined from Fig. 2. The values are found to be $r=2$ cm. and $s=0.605$ cm.

Referring to Equation 4, $$p=\frac{l}{\lambda}=n_s-n_r \qquad (23)$$

For a quarter-waveguide, $$p=\frac{\lambda}{4} \text{ and as } \lambda=1 \text{ cm.}$$

$$l=\frac{1}{4(n_s-n_r)}=0.357 \text{ cm.} \qquad (24)$$

For a half-waveguide, $l$ would be twice 0.357 or 0.714 cm.

The square guide section should have a length of about ½ or 1 wavelength or between 0.5 cm. and 1.0 cm. The transition sections 14 and 14' need be only a convenient small fraction of a wavelength. The choke groove 18 in the joint ring 15 must be approximately $\lambda/4$. The width of the groove is not critical, if it is less than $\lambda/8$. The overall length for the phase shifter for $\lambda=1$ cm. is approximately 3.5 cm. For constant values of $n_r$ and $n_s$ the length of the phase shifter is proportional to the wavelength.

*Operation of half-wave phase shifter*

Referring to Fig. 9, when the phase shifter is fed by a linear polarized wave through guide 4, $$y=a \sin \omega t \qquad (26a)$$

and $$x=0 \qquad (26b)$$

With the angle $\rho$ between the quarter-waveguides 5 and 5' equal to zero, and the guides 5 and 5' maintained fixed in these relative positions, the half-waveguide 19 is rotated through $\varphi$ degrees about its longitudinal axis, which is an extension of the axes of 4, 4', 5, 5', 13 and 13'. The mutually perpendicular axes of the components of the resolved waves in the half-waveguide section 19 are designated as $u$ and $v$ respectively. These axes correspond to $r$, $r'$, and $s$, $s'$, respectively, of the quarter-waveguide sections 5 and 5'.

The resolved electrical vectors at the exit end of the quarter-waveguide 5 have been defined as $$r_e=\frac{a}{\sqrt{2}}\sin \omega t \qquad (18a)$$

and $$s_e=\frac{a}{\sqrt{2}}\cos \omega t \qquad (18b)$$

With the half-waveguide 19 rotated $\varphi$ degrees with respect to quarter-waveguides 5 and 5', the resolved vectors about the $u$ and $v$ axes become:

$$u_b=r_e \cos \varphi+s_e \sin \varphi \qquad (27a)$$
$$v_b=r_e \sin \varphi-s_e \cos \varphi \qquad (27b)$$

or $$u_b=\frac{a}{\sqrt{2}}\sin (\omega t+\varphi) \qquad (28a)$$

$$v_b=\frac{a}{\sqrt{2}}\cos (\omega t+\varphi)$$

As there is a further phase shift of $\pi$ added to the $v_b$ vector to obtain the $v_e$ vector, $$u_e=\frac{a}{\sqrt{2}}\sin (\omega t+\varphi) \qquad (29a)$$

and $$v_e=\frac{a}{\sqrt{2}}\cos (\omega t+\varphi) \qquad (29b)$$

Resolving these components on the $r'$ and $s'$ axes, which are displaced backward from $u$ and $v$ by the angle $\varphi$, $$r'_b=u_e \cos \varphi-v_e \sin \varphi \qquad (30a)$$
$$s'_b=-u_e \sin \varphi-v_e \cos \varphi \qquad (30b)$$

or $$r'_b=\frac{a}{\sqrt{2}}\sin (\omega t-2\varphi) \qquad (31a)$$

$$s'_b=\frac{a}{\sqrt{2}}\cos (\omega t-2\varphi) \qquad (31b)$$

and $$r'_e=\frac{a}{\sqrt{2}}\sin (\omega t-2\varphi) \qquad (32a)$$

$$s'_e=\frac{a}{\sqrt{2}}\sin (\omega t-2\varphi) \qquad (32b)$$

As $$y'=\sqrt{(r'_e)^2+(s'_e)^2}$$

$$y'=a \sin (\omega t-2\varphi) \qquad (33)$$

Comparing Equation 33 with Equation 26$a$, it is seen that the amplitude of the waves has ben preserved, but that for a rotation of $\varphi$ degrees of the half-waveguide 19, introduces a phase shift of $2\varphi$ degrees.

An analysis may be made of the relation between vectors when a heterogeneous beam is applied to the half-wave phase shifter in Fig. 9 as can be made for the quarter-wave phase shifter in Fig. 8. It will be found that when a heterogeneous beam, such as might be produced by properly exiting a waveguide of square cross section, is transmitted through the half-wave phase shifter in Fig. 9, a rotation of the half-waveguide 19 of $\varphi$ degrees will produce a phase shift of $4\varphi$.

In applying the invention disclosed herein to particular installations, a considerable range of selection of filter sections is available. If tuning is not required in tthe installation, a single filter section comprising the feed guide section 2, birefringent section 3 and polarizer 2', shown in Fig. 3, may be used. However, as pointed out herein, the bandwidth of the filter is progressively narrowed by adding further filter sections in cascade. (See Fig. 6.) In such a cascade arrangement, the interferometer filter section (see Fig. 7) may be inserted, the input guide section 4 being connected to the output of polarizer section 2' and the output guide section 13 being connected to the input of birefringent guide section 3' (Fig. 3).

Where tuning is desired, either one of the two types of birefringent rotary-joint phase shifter sections may be used, such as are shown in Figs. 8 and 9, or any other type of phase shifter may be used.

In applying these phase shifters to an installation, both of the quarter-waveguides at the ends of these shifters can not be used both as a filter element and a phase shifter element due to the fact that a polarizer must be inserted between otherwise adjoining birefringent guide sections. Thus, in a filter made up of birefringent guide sections and phase shifters, the input of the phase shifter unit is a quarter-waveguide section but the length of the output end of the phase shifter unit depends upon its relative position in the cascade. As an example, the output end of the first phase shifter in a filter of units in cascade will be twice the length of the first birefringent guide section and the length of the output end of the second phase shifter will be twice the length of the output end of the first phase shifter.

Figure 12:
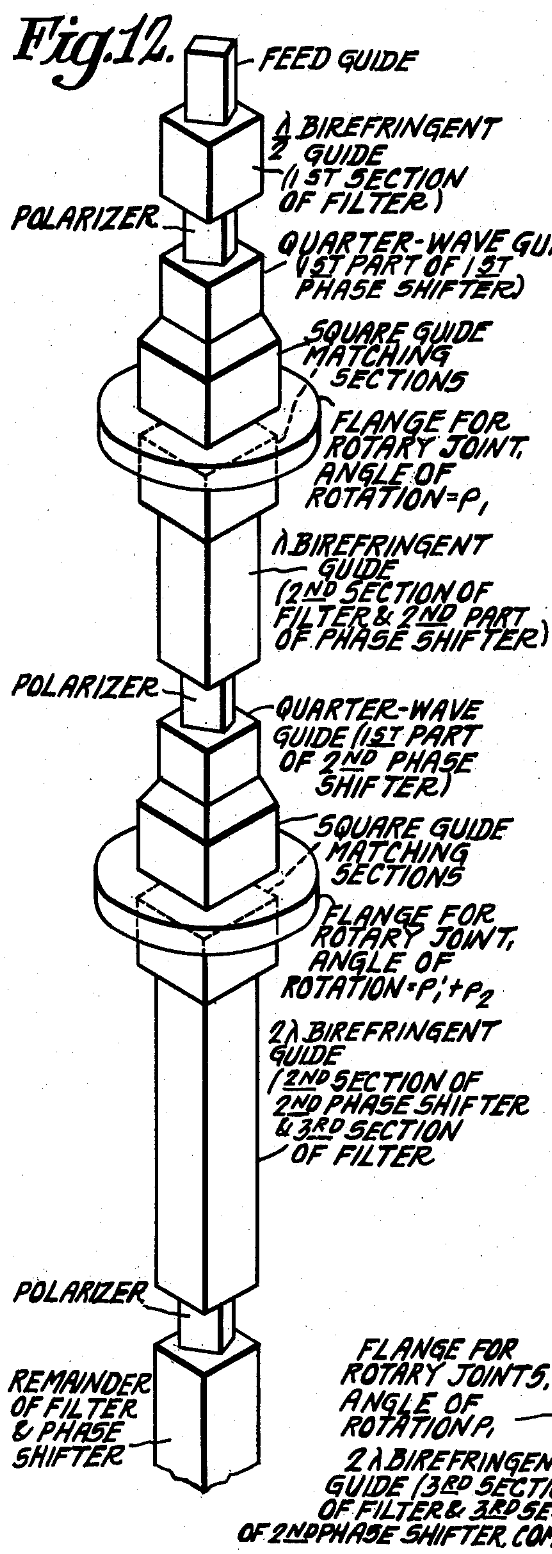
Fig. 12 is a view in perspective of a portion of a quarter-wave guide rotary-joint phase shifter.
Figure 13:
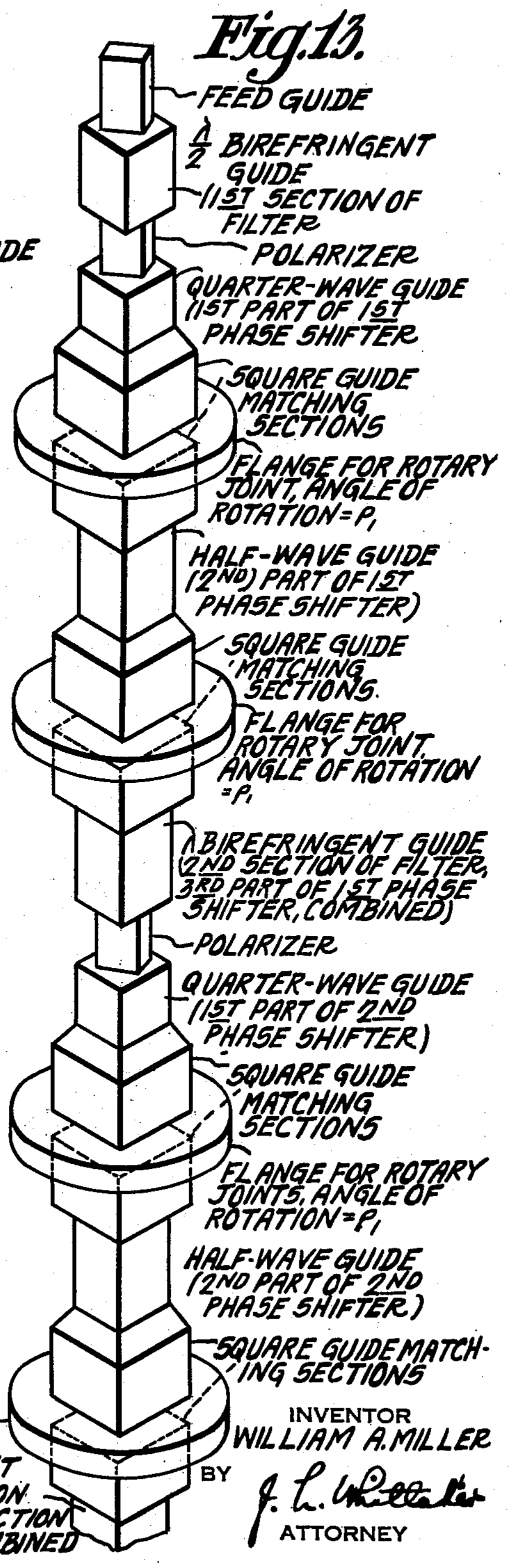
Fig. 13 is a view in perspective of a portion of a half-wave guide rotary-joint phase shifter.

Portions of such filters are shown in Figs. 12 and 13, in which the various sections are labeled.

As conventional movable tuning plugs may be substituted for the shorting plates 10 and 11 in the interferometer filter section in Fig. 7, such a section may be inserted in cascade with rotary-joint birefringent guide filter sections.

As between the two types of rotary-joint birefringent phase shifters, the half-waveguide type has the advantage of the independent rotating of a filter section without disturbing the positions of the other filter sections. When the quarter-wave filter sections are used, the sections progressively along the filter must be rotated an amount equal to rotations of the previous sections and in addition the amount of rotation required for the individual section.

There has thus been disclosed a microwave filter in which the transmitted waves in a guide system are resolved into two components at right angles to each other. The two components are then transmitted down a waveguide section having the physical properties of retarding one component with relation to the other component, such that at a critical distance from the input end of the waveguide section the components, when combined, suffer interference. Waves of undesired frequencies are eliminated by this interference while waves of a narrow bandwidth pass through the filter. Two types of retarding guide sections, birefringent and interferometer, are assembled in cascade respectively or in combination, or each in combination with rotary phase shifters and their associated birefringent sections.

What is claimed is:

A microwave filter for selectively transmitting microwave energy over a range of operating frequencies comprising, a quarter-wave retardation guide section which is birefringent over said operating range of frequencies, a half-wave retardation guide section which is birefringent over said operating range of frequencies, means for impressing on said quarter-wave retardation guide section a wave consisting of two equal plane polarized components polarized at right angles to each other with one component retarded one-quarter guide wavelength with respect to the other component, a polarizer connecting said quarter-wave guide section and said half-wave guide section, and a polarizer connected to the output end of said half-wave guide section, said polarizers each comprising a hollow pipe waveguide having broad and narrow walls with a longitudinal axis and dimensioned in the directions normal to said axis to have one and only one mode of propagation having a principal electric vector in one of said dimensions over said range of operating frequencies, the polarizers being connected to said quarter-wave retardation guide section and said half-wave retardation guide section with the broad walls of said polarizers oriented at angles of 45° to the planes of polarization of said two equal components.

References Cited in the file of this patent

UNITED STATES PATENTS

| | | |
|---|---|---|
| 2,129,669 | Bowen | Sept. 13, 1938 |
| 2,357,314 | Carter | Sept. 5, 1944 |
| 2,425,345 | Ring | Aug. 12, 1947 |
| 2,438,119 | Fox | Mar. 23, 1948 |
| 2,480,682 | Stiefel | Aug. 30, 1949 |